Dec. 24, 1935. F. G. CORNELL, JR 2,025,196
DEODORIZER
Filed Jan. 9, 1933
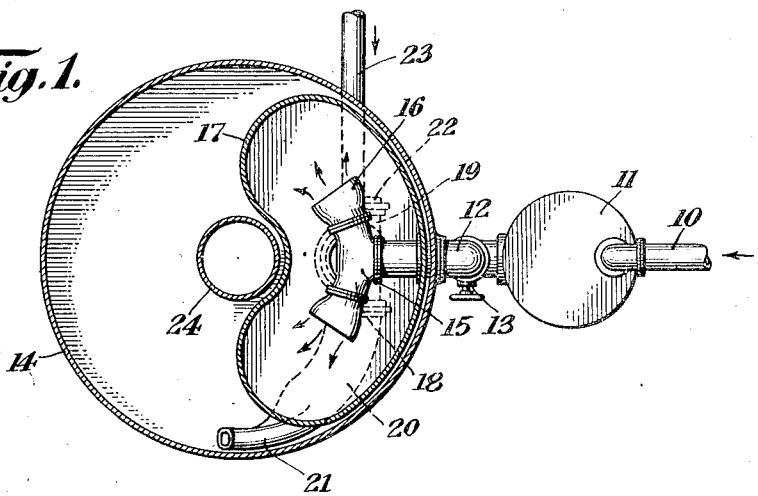
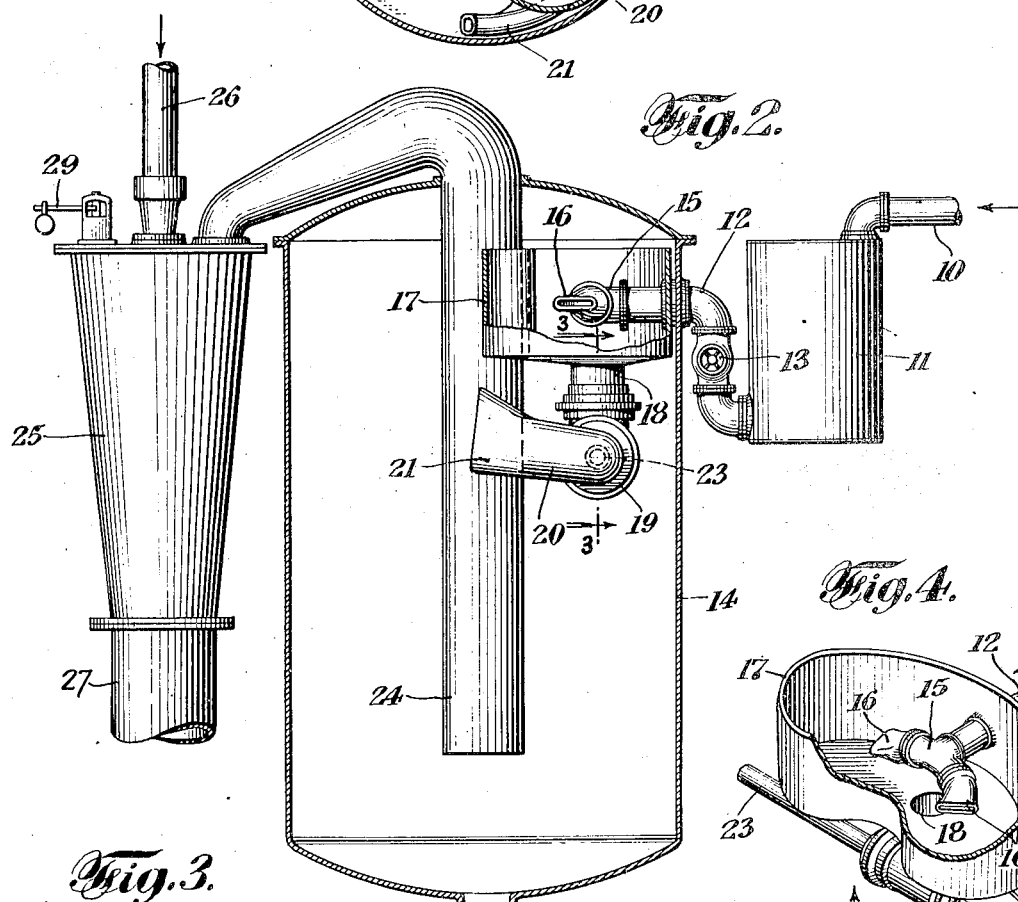
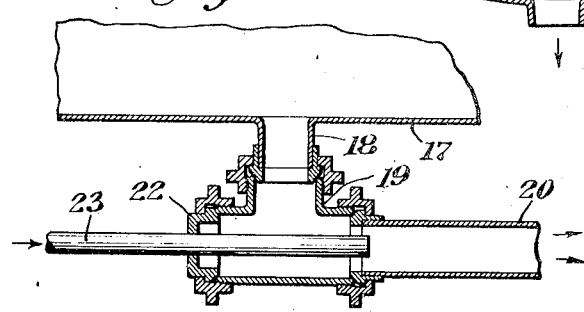
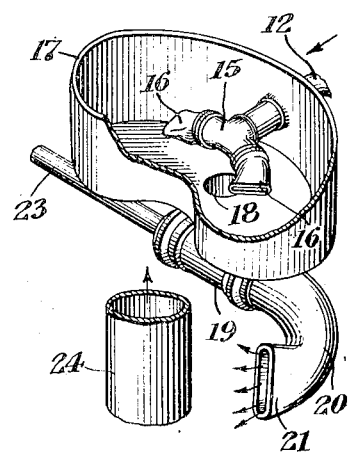
INVENTOR
Fritz G. Cornell Jr
BY Kenyon & Kenyon
ATTORNEYS Patented Dec. 24, 1935

2,025,196

UNITED STATES PATENT OFFICE 2,025,196

DEODORIZER

Fritz G. Cornell, Jr., Mountain Lakes, N. J.

Application January 9, 1933; Serial No. 650,854

14 Claims. (Cl. 99—11)

This invention relates to deodorization of liquid or semi-liquid products containing both volatile and non-volatile undesirable flavoring and odorous substances and more especially to deodorization of dairy products such as milk, cream and the like.

Dairy products such as milk and cream often contain volatile and non-volatile undesirable flavoring and odorous substances derived from the foods consumed by the producing animals and/or produced within the dairy product as a result of changes occurring through age or temperature or through bacterial or chemical action. These substances have high affinity for butter fat and its source and consequently are difficult to remove from the dairy product without undesirably affecting the physical condition or stability of the ultimate product.

An object of this invention is to remove undesirable odorous and flavoring substances from dairy products containing the same, efficiently and without harmfully affecting the ultimate product.

According to the present invention, heated cream or other dairy product is introduced into an evacuated container, thereby effecting expansion of the dairy product and vaporizing the more volatile undesirable substances contained therein and at the same time putting the dairy product into condition for subsequent vaporization of the less volatile substances and the removal of non-volatile substances. The ultimate vaporization of the volatile substances and the removal of the non-volatile substances are brought about by adding steam to the already expanded dairy product and directing the resulting mixture of water vapor and dairy product at high velocity along a circular path. The expansive action of the steam supplements the expansive action of the vacuum and effects ultimate vaporization of the volatile substances and release of the non-volatile substances which are entrained by the water vapor. The vapor and entrained non-volatile substances are separated from the liquid dairy product by the centrifugal action resulting from the travel of the liquid along a circular path and the liquid and vapor are withdrawn from the container to maintain the vacuum therein. As the steam is added to the dairy product after the latter has expanded under vacuum, the dairy product passes through two stages of relatively moderate expansion rather than through a single stage of violent expansion as would be the case if steam were added to the dairy product prior to the introduction thereof into the vacuum. The two-stage treatment prevents excessive emulsification of the fat in the dairy product and the vacuum treatment effects removal of undesirable flavoring and odorous substances at sufficiently low temperature to prevent the dairy product from being damaged by applied heat.

Other objects, novel features and advantages of this invention will be apparent from the following specification and accompanying drawing, wherein:

Fig. 1 is a horizontal section through an apparatus suitable for treating dairy products according to the invention;

Fig. 2 is a vertical section through such apparatus;

Fig. 3 is a section on the line 3—3 of Fig. 2, and

Fig. 4 is a fragmentary perspective view of a part of the apparatus.

A dairy product, such for example, as cream is supplied from a heater or pasteurizer (not shown) through a pipe 10 to a reservoir 11 which may be provided with means for controlling flow to the reservoir to maintain constant depth of liquid therein and from the reservoir the dairy product is conducted through a pipe 12 controlled by a valve 13. The pipe 12 leads into the interior of a cylindrical container 14 and terminates in a T 15 provided with flattened nozzles 16. The T and nozzles are arranged within a pan 17 in the upper portion of the tank 14.

The pan 17 is provided with an outlet conduit 18 to the end of which is attached a T 19. One arm of the T 19 is connected with a conduit 20 terminating in a flattened nozzle 21, the nozzle being arranged to discharge liquid tangentially of the inner wall of the tank 14. The other end of the T 19 is provided with a plug 22 to which a steam pipe 23 connects.

An exhaust conduit 24 is arranged centrally of the tank 14 and extends nearly to the bottom thereof, this conduit leading to an ejector condenser 25 to which water is supplied through the pipe 26 and discharged through the outlet 27. The ejector condenser maintains vacuum in the tank 14 in the well-known manner. The tank 14 is provided with an outlet 28 through which the deodorized dairy product is discharged. Also, a vacuum relief valve 29 is provided for limiting the degree of vacuum produced within the container by the ejector condenser.

Heated dairy product is drawn into the pan 17 through the nozzles 16 and is subjected to reduced pressure, thereby effecting vaporization of the more volatile substances and putting it into condition for subsequent vaporization of the less volatile substances and removal of the non-volatile substances. The vaporized substances escape from the pan into the container from which they are drawn out through the conduit 24 by the ejector condenser. The dairy product then flows from the pan 17 into the conduit 20 where it is intermixed with steam supplied to the pipe 23. The steam still further expands the dairy product and the resulting mixture is discharged into the container 14 through the nozzle 21 at high velocity in a thin stream and by reason of the tangential arrangement of the nozzle, the stream swirls around the container and moves downwardly to form a revolving cylindrical wall. While the stream swirls around the tank and flows downwardly, the remaining volatile substances are vaporized and the previously incorporated steam releases the non-volatile odorous and flavoring substances which become entrained in the water vapor resulting from the steam. The difference between the specific gravities of vapor and liquid effects separation of the vapors from the dairy product under the influence of the centripetal action of the revolving wall of dairy product and the non-volatile substances are washed out of the dairy product by the water vapor and conveyed away by the steam.

The vapors and entrained non-volatile substances flow centripetally toward the center of the container and are withdrawn through the conduit 24 to the ejector condenser 25 and the dairy product is discharged through the outlet 28, thus maintaining the vacuum in the container. The relief valve 29 prevents the vacuum within the container from exceeding a predetermined value. Preferably, the dairy product is preheated to approximately pasteurizing temperature, but other temperatures may be employed, depending upon the degree of vacuum in the container and the vacuum in the container may range from 10 inches mercury to as high as possible, but under usual conditions, the vacuum is maintained within the range of 17 to 25 inches of mercury. Under such vacuum conditions, vaporization of the volatile substances and removal of the non-volatile substances are effected at sufficiently low temperature to prevent damage to the dairy product by applied heat and yet at sufficiently high temperature to boil efficiently and produce effective vaporization. The period of time during which the steam remains in contact with the dairy product is sufficiently short to prevent heat penetrating the fat to such extent as to effect oiling off which would result in change to the body of the ultimate product and also affect the stability of such product.

With dairy product containing a variety of odors and flavors difficult to remove, the process preferably is divided in two stages. The dairy product is successively processed in two similar apparatuses, in the second of which is maintained a different degree of vacuum than in the first so that the temperature in the first apparatus is different than in the second. For example, a 17 inch mercury vacuum may be maintained in the first apparatus and a 23 inch mercury vacuum in the second apparatus so that the processing temperature in the first apparatus will be approximately 173° F. while processing temperature in the second apparatus will be approximately 147° F. This two-stage treatment is effective to remove substances not removable by a single stage process.

While the process has been specifically disclosed in the deodorization of dairy products, the utility of the process is not limited to deodorization of such products, but the process may be utilized for deodorization of other liquids containing volatile and non-volatile and odorous and flavoring substances, examples of such liquids being cocoanut oil, peanut oil and cotton seed oil.

It is of course understood that various modifications may be made both in the process and in the apparatus above disclosed without in any way departing from the spirit of the invention as defined in the appended claims.

I claim:

1. The process of deodorizing a dairy liquid which comprises flowing and expanding a preheated stream of said liquid into a sub-atmospheric pressure zone, collecting the liquid after expansion into a confined stream within said zone, injecting steam into said confined stream, discharging said stream into said zone, withdrawing from said zone vapors and gases emanating from said liquid and separately discharging liquid from said zone.

2. The process according to claim 1, wherein the liquid is introduced into the zone in a thin stream and after having been confined is discharged into the zone in a thin stream.

3. The process according to claim 1 wherein said confined stream is discharged into said zone along a circular path.

4. The process of deodorizing a dairy liquid which comprises flowing and expanding a thin preheated stream of said liquid into a sub-atmospheric pressure zone, collecting the liquid after expansion into a confined stream within said zone, injecting steam into said confined stream, discharging the confined liquid in a thin stream into said zone along a circular path, withdrawing from said zone vapors and gases emanating from said liquid and separately discharging liquid from said zone.

5. The process of deodorizing liquid and semi-liquid products which comprises discharging the same at elevated temperature in a thin stream into a vacuum pan, subsequently collecting the product and introducing steam into it, discharging the product in a thin stream into tangential contact with the wall of a cylindrical vacuum chamber and separating the resulting vapors and gases from the liquid while the latter is maintained at sub-atmospheric pressure.

6. The method of deodorizing liquid or semi-liquid products which comprises supplying a heated stream of such product to a pan within a container, maintaining sub-atmospheric pressure in said container, confining said stream and adding steam thereto, and again discharging said stream into said container.

7. The method of deodorizing liquid or semi-liquid products which comprises supplying a heated stream of such product to a pan within a container, maintaining sub-atmospheric pressure in said container, confining said stream and adding steam thereto, discharging said stream at high velocity into said container and directing said stream along a circular path.

8. The method of deodorizing liquid or semi-liquid products which comprises supplying a heated stream of such product to a pan within a container, maintaining sub-atmospheric pressure in said container, confining said stream and adding steam thereto, discharging said stream into said container and directing said stream along a circular path having a vertical axis.

9. The method of deodorizing liquid or semi-liquid products which comprises supplying a heated stream of such product to an evacuated container, confining said stream and adding steam thereto, discharging said stream at high velocity again into said container, directing said stream along a circular path to centripetally separate vapor from liquid and separately withdrawing the vapor and liquid.

10. An apparatus of the character described comprising a tank, means to maintain sub-atmospheric pressure within the tank, a container in said tank, means for introducing liquid into said container, an outlet conduit leading from said container, and means for introducing steam into said conduit.

11. An apparatus of the character described comprising a tank, means to maintain sub-atmospheric pressure within the tank, a container in said tank, a conduit for introducing liquid into said container, an outlet conduit leading from said container, said conduits terminating in flattered nozzles and means for introducing steam into said outlet conduit.

12. In a device of the character described, a vertical cylindrical tank, means for maintaining sub-atmospheric pressure in said tank and a container in said tank, a conduit for introducing liquid into said container, an outlet conduit from said container terminating tangentially to the inner surface of said tank, and means for introducing steam into said outlet conduit.

13. In a device of the character described, a vertical cylindrical tank, means for maintaining sub-atmospheric pressure in said tank and a container in said tank, a conduit for introducing liquid into said container, said conduit terminating in a flattened nozzle, and an outlet conduit from said container terminating in a flattened nozzle arranged tangentially to the inner wall of said tank, and means for introducing steam into said outlet conduit.

14. The process of deodorizing dairy liquid which comprises flowing and expanding a preheated stream of said liquid into a sub-atmospheric pressure zone, collecting the liquid after expansion in a second sub-atmospheric pressure zone, mixing steam with the liquid in said second zone, discharging the mixture from the second zone into the first zone, withdrawing from said first zone vapors and gases emanating from said liquid and said mixture and separately discharging liquid from said first zone.

FRITZ G. CORNELL, Jr.